(12) United States Patent
Potts et al.

(10) Patent No.: US 8,631,244 B1
(45) Date of Patent: Jan. 14, 2014

(54) SYSTEM AND METHOD FOR PREVENTING COMPUTER MALWARE FROM EXFILTRATING DATA FROM A USER COMPUTER IN A NETWORK VIA THE INTERNET

(75) Inventors: James N. Potts, Cedar Rapids, IA (US); Sung J. Kim, Cedar Rapids, IA (US); Julianne R. Crosmer, Cedar Rapids, IA (US); Karl F. Hoech, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 182 days.

(21) Appl. No.: 13/207,651

(22) Filed: Aug. 11, 2011

(51) Int. Cl.
*H04L 29/06* (2006.01)

(52) U.S. Cl.
USPC ............... 713/188; 726/24; 726/26; 713/182; 713/189

(58) Field of Classification Search
USPC ................................................. 713/182, 188
See application file for complete search history.

(56) References Cited

U.S. PATENT DOCUMENTS

| | | | |
|---|---|---|---|
| 6,772,347 B1 | 8/2004 | Xie | |
| 7,571,257 B2* | 8/2009 | Guthery | ........................ 709/250 |
| 7,640,433 B1 | 12/2009 | Marek | |
| 8,375,444 B2* | 2/2013 | Aziz et al. | ........................ 726/23 |
| 2004/0103322 A1 | 5/2004 | Wesinger | |
| 2004/0111519 A1 | 6/2004 | Fu | |
| 2004/0177120 A1* | 9/2004 | Kirsch | ........................ 709/206 |
| 2004/0255126 A1* | 12/2004 | Reith | ........................ 713/183 |
| 2005/0262558 A1 | 11/2005 | Usov | |
| 2006/0048212 A1* | 3/2006 | Tsuruoka et al. | ................. 726/4 |
| 2007/0022479 A1 | 1/2007 | Sikdar | |
| 2007/0174479 A1* | 7/2007 | Sperry et al. | .................. 709/233 |
| 2007/0266063 A1 | 11/2007 | Camiel | |
| 2009/0094342 A1 | 4/2009 | Leiba | |
| 2009/0158430 A1 | 6/2009 | Borders | |
| 2010/0077445 A1 | 3/2010 | Schneider | |
| 2010/0122313 A1 | 5/2010 | Ivgi | |
| 2010/0217971 A1* | 8/2010 | Radhakrishnan et al. | .... 713/153 |
| 2010/0312843 A1 | 12/2010 | Robinson | |
| 2012/0030293 A1* | 2/2012 | Bobotek | ....................... 709/206 |

* cited by examiner

*Primary Examiner* — Mohammad L Rahman
(74) *Attorney, Agent, or Firm* — Donna P. Suchy; Daniel M. Barbieri

(57) ABSTRACT

A system for preventing computer malware from exfiltrating data from a user computer in a network via the internet. A host-based network process monitor intercepts network traffic information from the user computer and transmits a network request including user and application information including the network traffic information. An authorization server cooperates with the host-based network process monitor for i) verifying whether the user and process in the network request should have network access, and ii) cryptographically signing the intercepted network traffic information with an authorization server key, to authorize network access for the intercepted network traffic information. A firewall system is operably connected to the user computer and the authorization server configured to inspect the network traffic information from the user computer and reject any traffic information not signed with the authorization server key.

19 Claims, 3 Drawing Sheets

SYSTEM AND METHOD FOR PREVENTING COMPUTER MALWARE FROM EXFILTRATING DATA FROM A USER COMPUTER IN A NETWORK VIA THE INTERNET

BACKGROUND OF THE INVENTION

1. Field of the Invention

The present invention relates generally to communication networks and more particularly to an enhanced system for protecting communication networks from malware.

2. Description of the Related Art

Sophisticated attacks against computer systems are increasing dramatically. For example, aerospace and defense contractors are especially targeted by foreign entities. It is extremely difficult to guard a system against these attacks. Many attacks now utilize zero-day (unknown before hand) attack factors that are not recognized by virus scanners. Attacks often combine highly sophisticated social-engineering and custom exploits to induce victims to load malicious software. These custom exploits are not recognized by available anti-virus/anti-spyware systems. Subverted machines use standard mechanisms to leak information. Exploits use standard protocols (i.e. HTTP) to transmit information, with network traffic indistinguishable from legitimate traffic.

U.S. Publicn. No. 2005/0262558, entitled "ON-LINE CENTRALIZED AND LOCAL AUTHORIZATION OF EXECUTABLE FILES," discloses a system and method for controlling the execution of executable files. The executables are identified by either a cryptographic digest or a digital certificate. The cryptographic digest is computed from the binary image of the executable. An executable that is attempting to execute is intercepted by a protection module that consults a database of stored rules over a secure channel to determine whether or not the executable can be identified as a permitted executable and whether or not it has permission to execute on a particular computer system under certain specified conditions. If a stored permission is available, it is used to control the execution. Otherwise, the user is consulted for permission.

U.S. Publicn. No. 2010/0077445, entitled "GRADUATED ENFORCEMENT OF RESTRICTIONS ACCORDING TO AN APPLICATION'S REPUTATION," discloses security software on a client that observes a request for a resource from an application on the client and then determines the application's reputation. The application's reputation may be measured by a reputation score obtained from a remote reputation server. The security software determines an access policy from a graduated set of possible access policies for the application based on the application's reputation. The security software applies the access policy to the application's request for the resource. In this way, the reputation-based system uses a graduated trust scale and a policy enforcement mechanism that restricts or grants application functionality for resource interactivity along a graduated scale.

SUMMARY OF THE INVENTION

In a broad aspect, the present invention is a system for preventing computer malware from exfiltrating data from a user computer in a network via the internet. A host-based network process monitor is operably connected to a user computer and configured to intercept network traffic information from the user computer and transmit a network request comprising user and application information including the network traffic information. An authorization server is operably connected to the host-based network process monitor containing a database of users and applications. The authorization server is configured to cooperate with the host-based network process monitor for i) verifying whether the user and process in the network request should have network access, and ii) cryptographically signing the intercepted network traffic information with an authorization server key, to authorize network access for the intercepted network traffic information. A firewall system is operably connected to the user computer and the authorization server. It is configured to inspect the network traffic information from the user computer and reject any traffic information not signed with the authorization server key.

Unlike US 2005/0262558, discussed above, the present invention uses file hashes at the firewall to decide whether to allow packets to pass or not. The '558 system, on the other hand, uses file hashes to decide whether to allow an executable to launch. It is a host-based system.

Unlike US 2010/0077445, discussed above, the present invention provides off-host firewalling of untrusted applications. The '445 system uses file reputation to enable/disable various amounts of user-rights on a host, which could include network access. It is also a host-based approach, not a proxy/firewall.

The present invention prevents malware from connecting to the outside world by adding process-level authentication and authorization to network traffic. The term "malware" as defined herein refers to malicious software (programming code, scripts, active content and other software) designed to gain unauthorized access to computer systems, gain unauthorized access to data stored on computer systems or networks, exfiltrate data stored on a computer or network, and/or provide a command and control interface to unauthorized users.

DETAILED DESCRIPTION OF THE INVENTION

Figure 1:
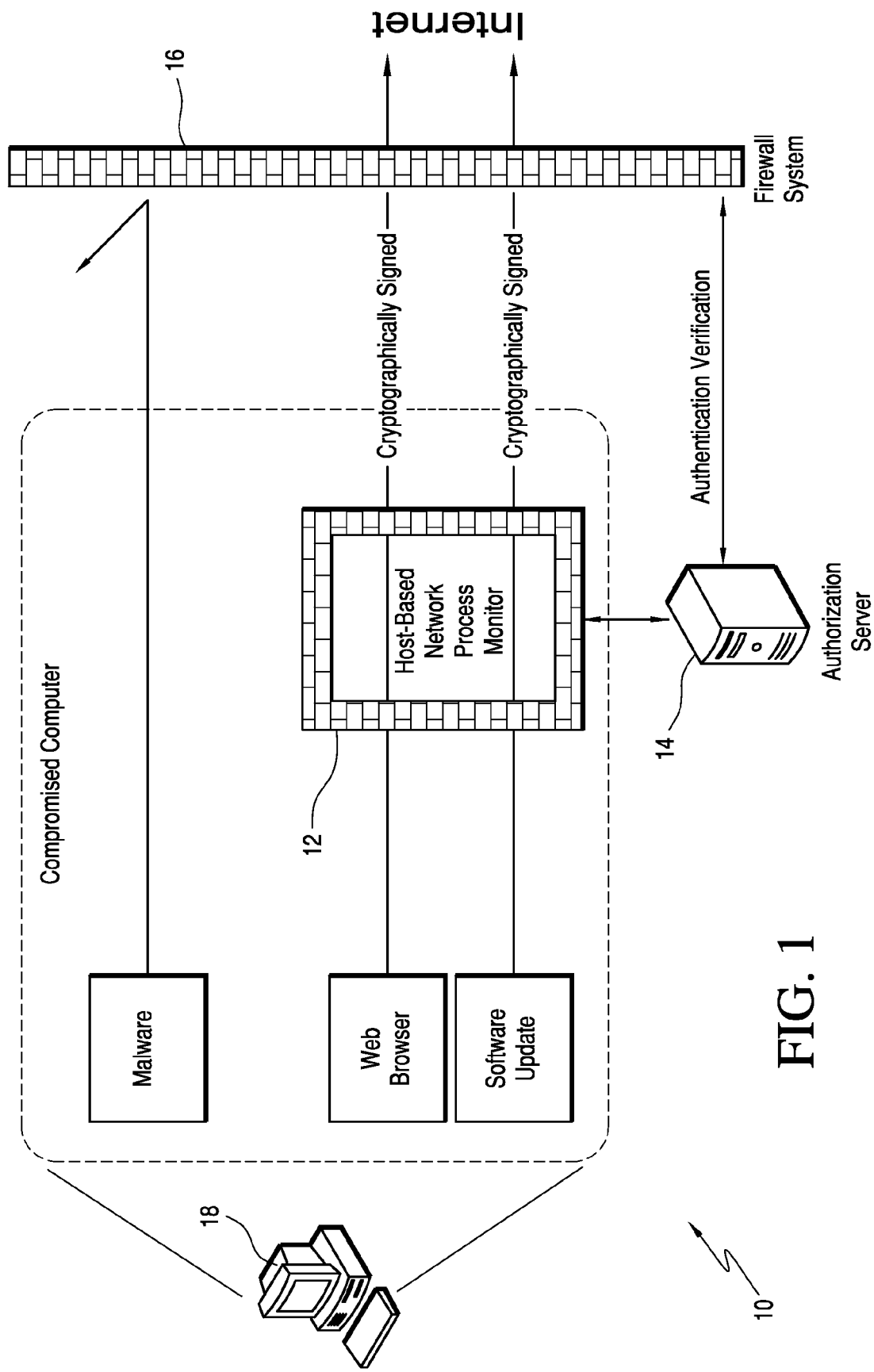
FIG. 1 is a schematic illustration of the system of the present invention for preventing computer malware from exfiltrating data from a user computer in a network via the internet.

Referring now to the drawings and the characters of reference marked thereon, FIG. 1 illustrates the system for preventing computer malware from exfiltrating data from a user computer in a network via the internet of the present invention, designated generally as 10. The system 10 includes a host-based network process monitor 12; an authorization server 14 and a firewall system 16. The host-based network process monitor 12 is operably connected to a user computer 18 and is configured to intercept network traffic information from the user computer 18 and transmit a network request comprising user and application information including the network traffic information. The authorization server 14 is operably connected to the host-based network process monitor 12. The authorization server 14 contains a database of users and applications. It is configured to cooperate with the host-based network process monitor 12 for i) verifying whether the user and process in the network request should have network access, and ii) cryptographically signing the intercepted network traffic information with an authorization server key, to authorize network access for the intercepted network traffic information. The firewall system 16 is operably connected to the user computer 18 and the authorization server 14 and is configured to inspect the network traffic information from the user computer 18 and reject any traffic information not signed with the authorization server key.

The host-based network process monitor is a software component running on the user host computer. The authorization server can be a software component running on a common computer server, or a standalone network appliance (a specialized computer system). The firewall system can be a software component providing functionality to a commercially available firewall proxy system, a standalone software component running on a computer server, or a standalone specialized computer system. The host-based network process monitor 12 may be incorporated into the user computer 18 or may be a specialized piece of computer hardware. Thus, the phrase that the host-based network process monitor 12 is "operably connected" to the computer 18 is deemed to be broadly construed to encompass both potential scenarios. Furthermore, as defined herein the term "internet" is meant to broadly refer to any internet working between disparate computer networks, including NIPRNet and SIPRNet.

The authorization server 14 may provide the cryptographic signing by signing individual network packets. This may be provided by, for example, applying internet protocol (IP) encapsulation by adding a cryptographic hash field to the intercepted network traffic information. Alternatively, it may be accomplished by applying an Internet Protocol header field such as an IPv4 header option field or IPv6 header chain field to the intercepted network traffic information. Or, such a signing may be accomplished by applying a transport layer wrapping protocol to the intercepted network traffic information.

The authorization server 14 may provide the cryptographic signing by adding a token. This may be by adding a tag-value pair to an application layer protocol.

Figure 2:
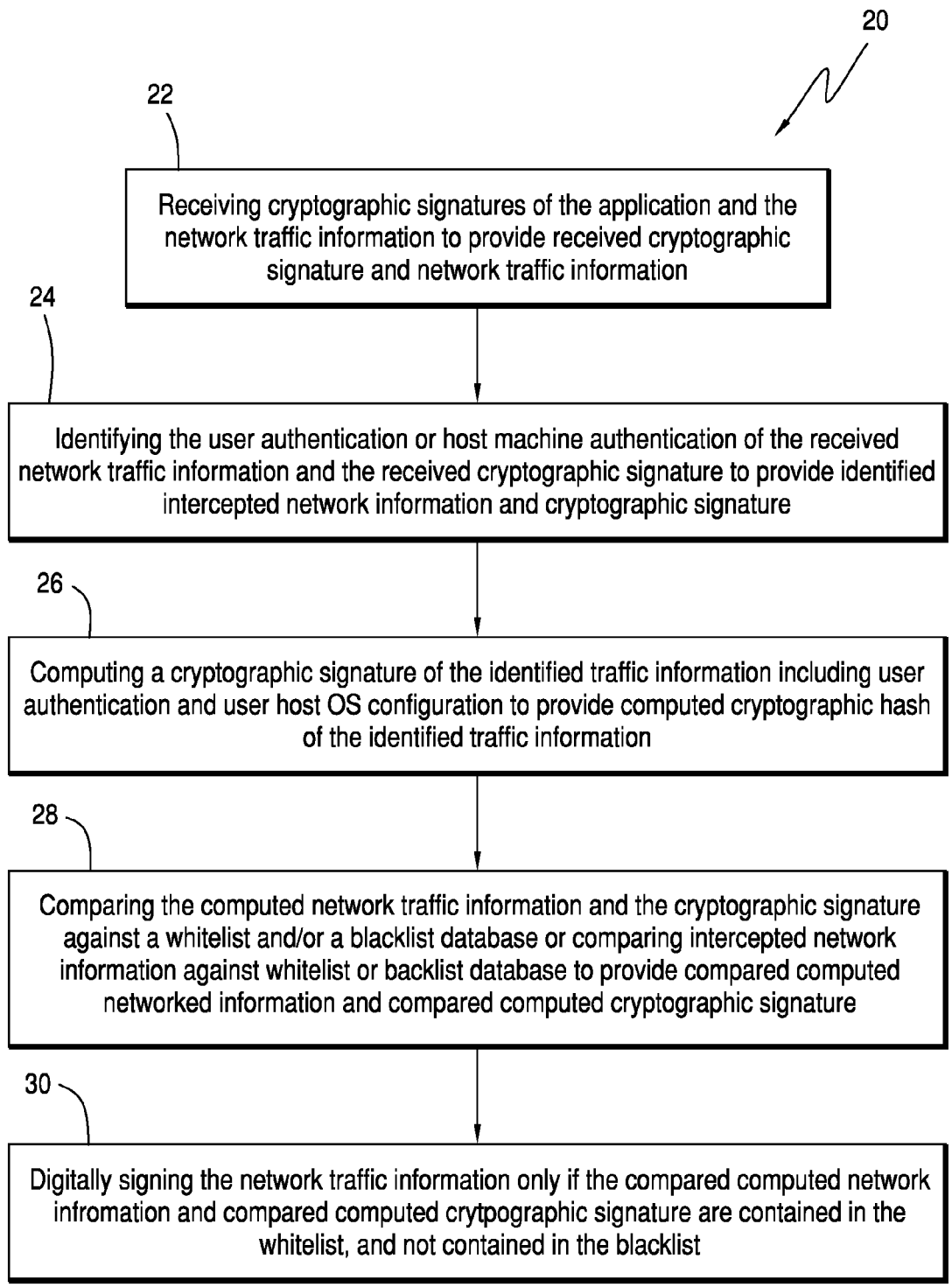
FIG. 2 is a flow chart showing one example of a decision making technique utilized by the authorization server of the present invention.

Alternatively, the authorization server 14 may provide the cryptographic signing by a decision making technique. Referring now to FIG. 2, an example decision making technique, designated generally as 20, may be as follows:

a) receiving cryptographic signatures of the application and the network traffic information to provide received cryptographic signature and network traffic information (process block 22);

b) identifying the user authentication or host machine authentication of the received network traffic information and the received cryptographic signature to provide identified intercepted network information and cryptographic signature (process block 24);

c) computing a cryptographic signature of the identified traffic information including user authentication and user host OS configuration to provide computed cryptographic hash of the identified traffic information (process block 26);

d) comparing the computed network traffic information and the cryptographic signature against a whitelist and/or a blacklist database or comparing intercepted network information against whitelist or backlist database to provide compared computed networked information and compared computed cryptographic signature (process block 28); and, e) digitally signing the network traffic information only if the compared computed network information and compared computed cryptographic signature are contained in the whitelist, and not contained in the blacklist (process block 30).

Figure 3:
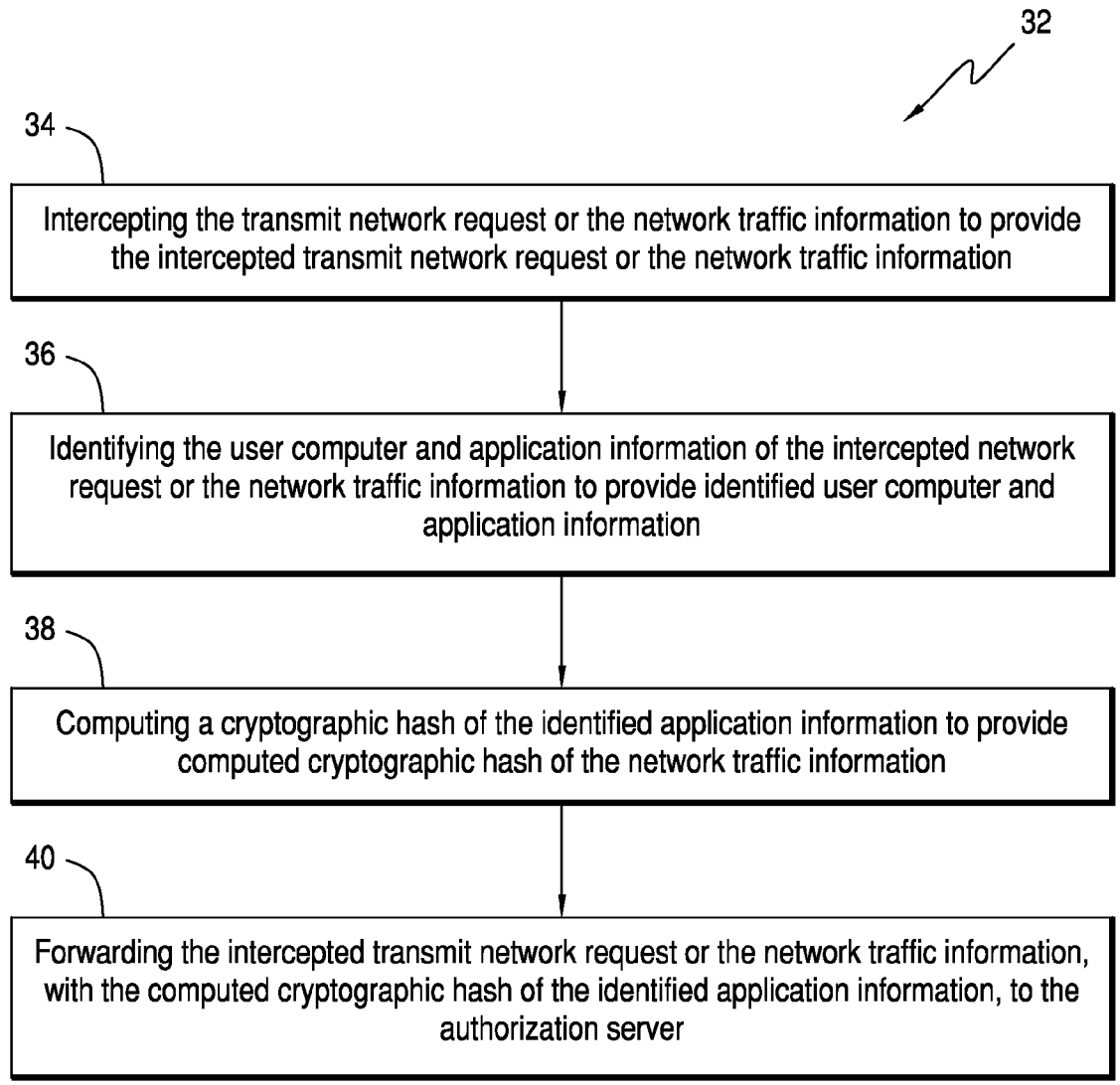
FIG. 3 is a flow chart showing an example of the host-based network process monitor.

Referring now to FIG. 3, the host-based network process monitor may provide monitoring of the network traffic information by the following process, designated generally as 32:

a) intercepting the transmit network request or the network traffic information to provide the intercepted transmit network request or the network traffic information (process block 34);

b) identifying the user computer and application information of the intercepted network request or the network traffic information to provide identified the user computer and application information (process block 36);

c) computing a cryptographic hash of the identified application information to provide computed cryptographic hash of the network traffic information (process block 38); and, d) forwarding the intercepted transmit network request or the network traffic information, with the computed cryptographic hash of the identified application information, to the authorization server (process block 40).

In general terms, the firewall system 16 of the present invention operates by the following process:

The firewall system 16 of the present invention is designed to properly cooperate with the type of authorization server used. For example, if individual network packets are signed, by i) applying internet protocol (IP) encapsulation by adding a cryptographic hash field to the intercepted network traffic information or, ii) by applying an IPv4 header option field or IPv6 header chain field to the intercepted network traffic information, then the firewall system 16 may provide inspection of the network traffic information by the process of:

a) receiving the cryptographically signed network traffic information;

b) testing the validity of the cryptographic signature to provide validated cryptographic signature;

c) stripping the signature to restore the request to provide original state prior to interception by host process monitor, and d) forwarding the original intercepted network traffic information to an internet destination only if the signature is valid.

If the authorization server provides the cryptographic signing by signing individual network packets, by applying a transport layer wrapping protocol to the intercepted network traffic information then the firewall system 16 may operate as follows:

a) receiving the cryptographically signed token within the application layer protocol;

b) testing validity of the cryptographic signature to provide validated cryptographic signature;

c) stripping the token to restore the application layer request to provide original state prior to interception by host process monitor, and d) forwarding the original intercepted network traffic information to internet destination only if signature is valid.

Other embodiments and configurations may be devised without departing from the spirit of the invention and the scope of the appended claims.

The invention claimed is:

1. A system for preventing computer malware from exfiltrating data from a user computer in a network via an internet, comprising:

a) a host-based network process monitor operably connected to the user computer configured to intercept network traffic information from said user computer and transmit a network request comprising user and application information including said network traffic information;

b) an authorization server operably connected to said host-based network process monitor containing a database of users and applications, said authorization server configured to cooperate with said host-based network process monitor for i) verifying whether the user and process in said network request should have network access, and ii) cryptographically signing said intercepted network traffic information with an authorization server key, to authorize network access for said intercepted network traffic information, wherein said authorization server provides said cryptographic signing by a decision making technique, by the process of:
- i) receiving cryptographic signatures of said application and said network traffic information to provide received cryptographic signature and network traffic information;
- ii) identifying a user authentication or host machine authentication of said received network traffic information and said received cryptographic signature to provide identified intercepted network traffic information and cryptographic signature of said application;
- iii) computing a cryptographic signature of said identified traffic information including user authentication to provide computed cryptographic hash of said identified traffic information; and,
- iv) comparing said computed cryptographic signature of said intercepted network traffic information and said cryptographic signature of said application against a whitelist and/or a blacklist database or comparing intercepted network information against a whitelist or backlist database to provide compared computed cryptographic signature of said identified intercepted information and said cryptographic signature of said application; and
- v) digitally signing the received network traffic information only if said compared computed network information and compared computed cryptographic signature are contained in said database whitelist, and not contained in said blacklist; and, c) a firewall system operably connected to said user computer and said authorization server, configured to inspect said intercepted network traffic information from said user computer and reject any traffic information not signed with said authorization server key.

2. The system of claim 1, wherein said authorization server provides said cryptographic signing by signing individual network packets.

3. The system of claim 1, wherein said authorization server provides said cryptographic signing by signing individual network packets, by applying internet protocol (IP) encapsulation by adding a cryptographic hash field to said intercepted network traffic information.

4. The system of claim 1, wherein said authorization server provides said cryptographic signing by signing individual network packets, by applying an Internet Protocol header field to said intercepted network traffic information.

5. The system of claim 1, wherein said authorization server provides said cryptographic signing by signing individual network packets, by applying a transport layer wrapping protocol to said intercepted network traffic information.

6. The system of claim 1, wherein said authorization server provides said cryptographic signing by adding a token.

7. The system of claim 1, wherein said authorization server provides said cryptographic signing by adding a token, by adding a tag-value pair to an application layer protocol.

8. The system of claim 1, wherein said authorization server provides said cryptographic signing by adding a token, by providing a tag-value pair matched to the application layer protocol via an out-of-band transport.

9. The system of claim 1, wherein said authorization server provides said cryptographic signing by computing a cryptographic signature of said identified traffic information including user host OS configuration to provide said computed cryptographic hash of said identified intercepted traffic information.

10. The system of claim 1, wherein said host-based network process monitor provides monitoring of said network traffic information by the process of:
- a) intercepting said transmitted network request or said network traffic information to provide an intercepted transmit network request or intercepted network traffic information;
- b) identifying the user computer and application information of said intercepted network request or intercepted network traffic information to provide identified said user computer and application information;
- c) computing a cryptographic hash of said identified application information to provide computed cryptographic hash of said identified application information; and,
- d) forwarding said intercepted transmit network request or said network traffic information, with said computed cryptographic hash of said identified application information, to said authorization server.

11. A system for preventing computer malware from exfiltrating data from a user computer in a network via an internet, comprising:
- a) a host-based network process monitor operably connected to the user computer configured to intercept network traffic information from said user computer and transmit a network request comprising user and application information including said network traffic information;
- b) an authorization server operably connected to said host-based network process monitor containing a database of users and applications, said authorization server configured to cooperate with said host-based network process monitor for i) verifying whether the user and process in said network request should have network access, and ii) cryptographically signing said intercepted network traffic information with an authorization server key, to authorize network access for said intercepted network traffic information; and,
- c) a firewall system operably connected to said user computer and said authorization server, configured to inspect said intercepted network traffic information from said user computer and reject any traffic information not signed with said authorization server key, wherein said firewall system provides inspection of said network traffic information by the process of:
  - receiving said cryptographically signed network traffic information;
  - testing the validity of said cryptographic signature to provide validated cryptographic signature;
  - stripping said validated signature to restore said request to provide original state prior to interception by host process monitor, and
  - forwarding said original intercepted network traffic information to an internet destination only if said signature is valid.

12. The system of claim 2, wherein said firewall system provides inspection of said network traffic information by the process of:
- a) receiving said cryptographically signed individual network packets;

b) testing validity of said cryptographic signature to provide validated cryptographic signature;
c) stripping said validated signature to restore said signed individual network packets to provide original state prior to interception by host process monitor, and
d) forwarding said intercepted network traffic information to an internet destination only if said signature is valid.

13. The system of claim 3, wherein said firewall system provides inspection of said network traffic information by the process of:
   a) receiving said cryptographically signed individual network packets;
   b) testing validity of said cryptographic signature to provide validated cryptographic signature;
   c) stripping said validated signature to restore said signed individual network packets to provide original state prior to interception by host process monitor, and
   d) forwarding said intercepted network traffic information to an internet destination only if said signature is valid.

14. The system of claim 4, wherein said firewall system provides inspection of said network traffic information by the process of:
   a) receiving said cryptographically signed individual network packets;
   b) testing validity of said cryptographic signature to provide validated cryptographic signature;
   c) stripping said validated signature to restore said signed individual network packets to provide original state prior to interception by host process monitor, and
   d) forwarding said intercepted network traffic information to an internet destination only if said signature is valid.

15. The system of claim 5, wherein said firewall system provides inspection of said network traffic information by the process of:
   a) receiving said cryptographically signed individual wrapped network packets;
   b) testing validity of said cryptographic signature to provide validated cryptographic signature;
   c) stripping said validated signature and transport layer wrapper to restore said signed individual network packets to provide original state prior to interception by host process monitor, and
   d) forwarding said intercepted network traffic information to an internet destination only if said signature is valid.

16. The system of claim 6, wherein said firewall system provides inspection of said network traffic information by the process of:
   a) receiving said cryptographically signed token and network traffic information;
   b) testing validity of said cryptographic signature to provide validated cryptographic signature;
   c) stripping said validated signature to restore network traffic information to provide original state prior to interception by host process monitor, and
   d) forwarding said intercepted network traffic information to an internet destination only if said signature is valid.

17. The system of claim 7, wherein said firewall system provides inspection of said network traffic information by the process of:
   a) receiving said cryptographically signed token within said application layer protocol;
   b) testing validity of said cryptographic signature to provide validated cryptographic signature;
   c) stripping said validated signature to restore said application layer request to provide original state prior to interception by host process monitor, and
   d) forwarding said intercepted network traffic information to internet destination only if signature is valid.

18. A method for preventing computer malware from exfiltrating data from a user computer in a network via an internet, comprising:
   a) intercepting network traffic information from said user computer utilizing a host-based network process monitor operably connected to the user computer and transmitting a network request comprising user and application information including said network traffic information;
   b) verifying whether the user and process in said network request should have network access utilizing an authorization server operably connected to said host-based network process monitor containing a database of users and applications;
   c) cryptographically signing said intercepted network traffic information with an authorization server key, to authorize network access for said intercepted network traffic information, wherein said authorization server provides said cryptographic signing by a decision making technique, by the process of:
      i) receiving cryptographic signatures of said application and said network traffic information to provide received cryptographic signature and network traffic information;
      ii) identifying a user authentication or host machine authentication of said received network traffic information and said received cryptographic signature to provide identified network traffic information and cryptographic signature of said application;
      iii) computing a cryptographic signature of said identified traffic information including user authentication to provide computed cryptographic hash of said identified traffic information; and,
      iv) comparing said computed cryptographic signature of said intercepted network traffic information and said cryptographic signature of said application against a whitelist and/or a blacklist database or comparing intercepted network information against a whitelist or backlist database to provide compared computed cryptographic signature of said identified intercepted information said cryptographic signature of said application; and
      v) digitally signing the received network traffic information only if said compared computed network information and compared computed cryptographic signature are contained in said database whitelist, and not contained in said blacklist; and,
   d) inspecting said intercepted network traffic information from said user computer and rejecting any traffic information not signed with said authorization server key utilizing a firewall system operably connected to said user computer and said authorization server.

19. The system of claim 1, wherein said authorization server provides said cryptographic signing by computing said cryptographic signature of said identified traffic information including user host OS configuration.

* * * * *